(12) United States Patent
Digesu'

(10) Patent No.: US 12,269,444 B2
(45) Date of Patent: Apr. 8, 2025

(54) HYDRAULIC BRAKING ARRANGEMENT FOR OFF-ROAD VEHICLES

(71) Applicant: CNH Industrial America LLC, New Holland, PA (US)

(72) Inventor: Pasquale Digesu', Modena (IT)

(73) Assignee: CNH Industrial America LLC, New Holland, PA (US)

( * ) Notice: Subject to any disclaimer, the term of this patent is extended or adjusted under 35 U.S.C. 154(b) by 931 days.

(21) Appl. No.: 17/255,792

(22) PCT Filed: Jun. 26, 2019

(86) PCT No.: PCT/EP2019/067044
§ 371 (c)(1),
(2) Date: Dec. 23, 2020

(87) PCT Pub. No.: WO2020/007685
PCT Pub. Date: Jan. 9, 2020

(65) Prior Publication Data
US 2021/0146902 A1      May 20, 2021

(30) Foreign Application Priority Data
Jul. 4, 2018   (IT) ........................ 102018000006929

(51) Int. Cl.
*B60T 13/68*   (2006.01)
*B60T 7/16*    (2006.01)

(52) U.S. Cl.
CPC ............. *B60T 13/686* (2013.01); *B60T 7/16* (2013.01); *B60T 2270/14* (2013.01); *B60T 2270/402* (2013.01); *B60Y 2200/20* (2013.01)

(58) Field of Classification Search
CPC ........ B60T 8/3275; B60T 8/4013; B60T 8/17; B60T 8/326; B60T 8/404; B60T 11/21; B60T 13/146; B60T 13/662; B60T 13/148; B60T 2270/402; B60T 2270/413; B60T 7/16; B60T 13/686; B60T 2270/14; B60Y 2200/20
See application file for complete search history.

(56) References Cited

U.S. PATENT DOCUMENTS 5,690,396 A * 11/1997 Johnston ............... B60T 13/686
                                                          303/3
9,283,932 B2 * 3/2016 Bleckmann ............. B60D 1/62
(Continued)

OTHER PUBLICATIONS

International Search Report and Written Opinion dated Oct. 17, 2019 for related International Application No. PCT/EP2019/067044 (11 pages).

*Primary Examiner* — Thomas J Williams
(74) *Attorney, Agent, or Firm* — Rickard K. DeMille; Rebecca L. Henkel; Peter K. Zacharias

(57) ABSTRACT

A hydraulic braking arrangement for controlling front brakes and rear brakes of an off-road vehicle includes a hydro-mechanical service brake system fluidly connecting front and rear brakes to a first source of fluid in pressure by means of a mechanical input which may be imparted by a driver of said off-road vehicle. The hydraulic braking arrangement also includes an additional service brake system fluidly connecting front and rear brakes to a second source of fluid in pressure by means of an electro-hydraulic proportional valve and a remote input.

15 Claims, 3 Drawing Sheets

(56) References Cited

U.S. PATENT DOCUMENTS

| | | | |
|---|---|---|---|
| 2001/0056544 A1* | 12/2001 | Walker | B60W 50/029 |
| | | | 180/170 |
| 2002/0057012 A1* | 5/2002 | Bourguet | B64C 25/44 |
| | | | 303/113.1 |
| 2002/0175561 A1 | 11/2002 | Jensen | |
| 2004/0036350 A1* | 2/2004 | Rowe | B60T 13/662 |
| | | | 303/89 |
| 2004/0195909 A1* | 10/2004 | Hamzeh | B60T 8/00 |
| | | | 303/10 |
| 2004/0239173 A1* | 12/2004 | Williams | B60T 8/325 |
| | | | 303/3 |
| 2011/0187180 A1* | 8/2011 | Frank | B60T 8/1703 |
| | | | 303/2 |
| 2011/0316327 A1 | 12/2011 | Rekow et al. | |
| 2013/0221737 A1* | 8/2013 | Richard | B60T 8/4077 |
| | | | 303/119.1 |
| 2017/0001614 A1* | 1/2017 | Yogo | B60T 8/4872 |
| 2017/0166176 A1* | 6/2017 | Yang | B60T 7/042 |
| 2020/0010060 A1* | 1/2020 | Tanaka | B60T 7/02 |
| 2020/0055504 A1* | 2/2020 | Weitze | B60T 8/4081 |
| 2020/0064825 A1* | 2/2020 | Woodley | G05D 1/0011 |

* cited by examiner

HYDRAULIC BRAKING ARRANGEMENT FOR OFF-ROAD VEHICLES

CROSS REFERENCE TO RELATED APPLICATIONS

This application is a US National Stage filing of International Application Serial No. PCT/EP2019/067044 entitled "HYDRAULIC BRAKING ARRANGEMENT FOR OFF-ROAD VEHICLES," filed Jun. 26, 2019, which claims priority to Italian Application Serial No. 102018000006929, filed Jul. 4, 2018, each of which is incorporated by reference herein in its entirety for all purposes.

TECHNICAL FIELD

The present invention concerns a hydraulic braking arrangement for off-road vehicles, in particular an electromechanical hydraulic arrangement for agricultural vehicles.

BACKGROUND OF THE INVENTION

Autonomous driving vehicles are becoming more and more utilized thanks to the innovations in informatics and telecommunication fields.

Consequently, also off-road vehicles, such as agricultural vehicles, needs more and more implementations to allow these latter to be automatically/remotely controlled even by means of any wireless system.

Autonomous/remotely controlled vehicles are aimed to reduce the driver activity, and consequently its costs, and to improve safety of the driving.

Actual off-road vehicles, because of their weight and power, needs hydraulic braking circuits to guarantee an acceptable service braking of the vehicle.

Control of braking system could be realized in several different ways, for example using a SAHR (spring applied hydraulically released) system, or and ABS (Adaptive Braking Systems) system, or even more complex architectures.

Moreover, the aforementioned systems, in particular SAHR, have been developed for being "fail safe" system, i.e. intrinsically safe systems and not primarily for being controlled by remote. Such control may be implemented because SAHR comprises an electro-actuated valve which can be controlled by remote. Also ABS system has been primarily realized for different aims and may be used for remote control of brake by introducing a communication between the ABS control unit and a remote controller.

However all the above mentioned solutions are bulky and costly and therefore are not suitable for being implemented in off-road vehicles.

Park brake is usually a mechanical clutch which is manually or electrically operated and holds the gears of the transmission and consequently the vehicle driving axle.

Therefore, a further need is to allow a remote/on board control of parking braking system of off-road vehicles while containing costs.

An aim of the present invention is to satisfy the above mentioned needs.

SUMMARY OF THE INVENTION

The aforementioned aim is reached by a hydraulic braking arrangement as claimed in the appended set of claims.

BRIEF DESCRIPTION OF DRAWINGS

For a better understanding of the present invention, a preferred embodiment is described in the following, by way of a non-limiting example, with reference to the attached drawings wherein.

DETAILED DESCRIPTION OF THE INVENTION

In the following, the terms "first", "second" etc, are used merely to improve the clarity of the present description; i.e. the presence of a "first" element does not necessarily imply the presence of a "second" element.

Figure 1:
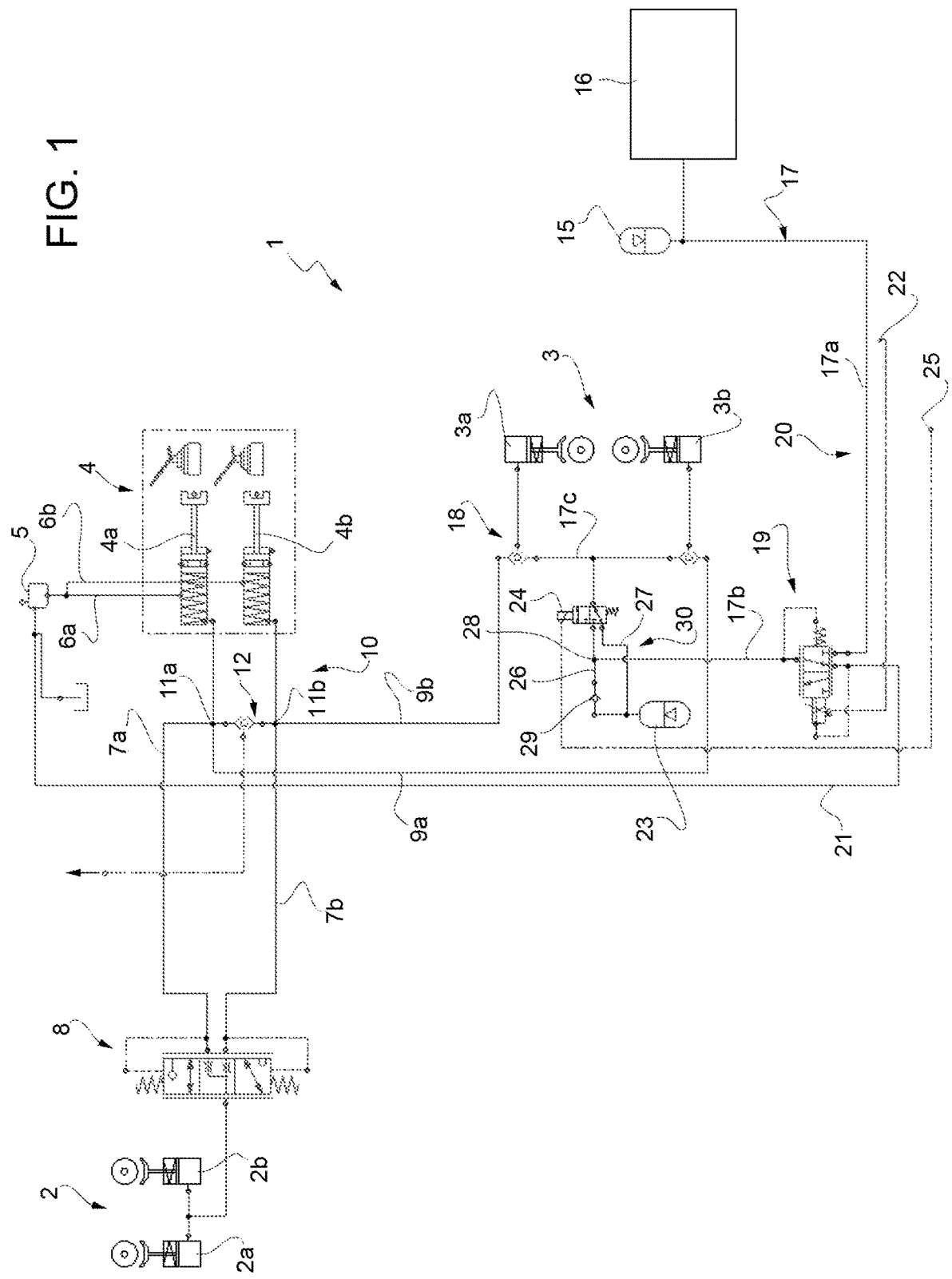
FIG. 1 is a hydraulic scheme of the hydraulic braking arrangement according a first embodiment of the invention in a first operative condition.

FIG. 1 discloses a hydraulic braking arrangement 1 for controlling front and rear braking systems 2, 3 of a vehicle. Front and rear braking systems 2, 3 each comprises a left 2a, 3a and a right 2b, 3b braking device, such as wet disk brakes or dry disk caliper brakes with or without springs, configured to impart a braking torque to wheels of the vehicle.

According to the present invention, as described hereunder in greater detail, arrangement 1 comprises a hydromechanical service brake system 10 fluidly connecting front and rear brakes 2, 3 to a first source of fluid in pressure generated by a mechanical input which may be imparted by a driver of the off-road vehicle and a remote controlled service brake system 20 fluidly connecting rear brakes 3 to a second source of fluid in pressure in function of a remote input; advantageously the arrangement 1 may further comprise a remote controlled park brake system 30 fluidly connecting rear brakes 3 to a third source of fluid in pressure in function of a remote input.

Hydraulic subsystem 10 is related to a on-board hydromechanical control of the service brake of the vehicle and comprises a device configured to transform a mechanical pressure input, e.g. received by the pressure imparted by a user on a pedal, into a hydraulic pressure output; for instance such device may be at least a master cylinder 4, in the described configuration right and left master cylinders 4a, 4b. Master cylinders 4a, 4b are fed by an oil reservoir 5, e.g. an oil tank, configured to store the oil at a pre-set pressure, fluidly connected to master cylinders 4a, 4b via respective first and second feeding conduits 6a, 6b.

Master cylinders 4a, 4b are fluidically connected via respective rear feeding conduits 9a, 9b to rear tractor brakes 3a, 3b as described in greater detail in the following.

From respective connection points 11a, 11b on rear feeding conduits 9a, 9b, front feeding conduits 7a, 7b depart to connect master cylinders 4a, 4b to front tractor brakes 2a, 2b. It is known to interpose a valve 8 on feeding conduits 7a, 7b between front tractor brakes 2a, 2b and master cylinders 4a, 4b.

Valve 8 may be a hydraulic piloted valve three way three positions controlled by the pressure signals detected on conduits 7a, 7b. This valve is a logic valve that is used for the front brake management during braking maneuver.

Hydraulic subsystem 10 may further comprise a valve 12 fluidically interposed between connection points 11a, 11b; preferably valve 12 is a shuttle valve configured to send a hydraulic pilot signal to a trailer brake valve or other equivalent valves that work in combination with pedal brake system.

The hydraulic subsystem 20 related to a remote electro-hydraulic control of the service brake of the vehicle may comprise a first accumulator 15 configured to store fluid at a predefined pressure and a known recharging module 16 configured to keep the accumulator in wanted working conditions.

First accumulator 15 is fluidly connected to rear tractor brakes 3a, 3b via a first accumulator conduit 17; in greater detail, first accumulator conduit 17 fluidly connects accumulator 15 to valves 18 which fluidly connect first accumulator conduit 17 and feeding conduits 9a, 9b. Advantageously valves 18 are shuttle valves configured to isolate hydraulic subsystem 10 and hydraulic subsystem 20 by allowing the passage to rear brakes 3a, 3b of the greater fluid signal between the ones coming from accumulator 15 or from master cylinders 4a, 4b.

Hydraulic braking arrangement 1 further comprises a hydraulic valve 19 fluidly interposed on first accumulator conduit 17 and fluidly connected to tank 5 via a return circuit 21; preferably, valve 19 is an electrically actuated proportional three ways-two positions valve controlled by an electrical input signal 22. First accumulator conduit 17 therefore comprises two portions, a first portion 17a upstream with respect to valve 19 and a second portion 17b downstream with respect to valve 19.

In a first position of valve 19 fluid may pass from brakes 3 to tank 5, while in a second position of valve 19 fluid may pass from accumulator 15 to brakes 3.

Hydraulic braking arrangement 1 further comprises a hydraulic subsystem 30 related to a remote electro-hydraulic control of the parking brake of the vehicle; subsystem 30 may comprise a second accumulator 23 configured to store fluid at a predefined pressure and fluidly connected to brakes 3a, 3b.

According to the described disposition, second accumulator 23 is fluidly connected to brakes 3a, 3b via a valve 24 fluidly interposed between accumulator 23 and conduit 17 upstream with respect to valves 18. In particular, said valve 24 is an electro actuated three ways—two positions ON-OFF valve controlled by an electrical input signal 25 and second accumulator 23 is fluidly connected to such valve 24 via a second and third accumulator conduits 26, 27. First accumulator conduit 17 therefore comprises a further portion 17c downstream with respect to valve 24, which bifurcates to join valves 18.

Electrical inputs 22 and 25 are generated by corresponding remote signals which are received by the outside of the vehicle, for example they can be received by by means of a wireless system.

Second accumulator conduit 26 is further fluidly connected to first accumulator 15, and consequently to the recharging module 16, through portions 17b and 17a by a connection point 28 and a check valve 29 is fluidically interposed on second accumulator conduit 26, placed downstream with respect second accumulator 23 but upstream connection point 28. Valve 29 aims to prevent discharging of the accumulator 23 when line 21 is connected by the valve 19 to point 28

In a first position of valve 24 (parking maneuver from remote control) fluid may flow from second accumulator 23 to brakes 3a, 3b via conduit 27 and in a second position of valve 24 (service brake maneuver) fluid may flow from valve 19 and its upstream conduits to brakes 3a, 3b; in this position of the valve 24 the second accumulator 23 via conduit 26 can be recharged via portions 17b, 17a and valve 19.

The operation of the hydraulic braking arrangement 1 according to the first embodiment of the present invention is the following.

The driver may be located on the vehicle and operates brakes in a hydro-mechanical way via subsystem 10. In particular, e.g. by pedals, it may operate master cylinders 4 to impart a signal on front brakes 2 via conduits 7a, 7b and valve 8 and to rear brakes 3 via conduits 9a and 9b. The partition of brake between rear and front brakes is modulated in known way. At the same time, thanks to shuttle valve 12 a pilot signal is sent to trailed brake system. Park brake may be activated, when needed, via a lever which, in known way, can act on transmission gears/shaft with clutches or similar devices to reduce vehicle speed to zero, several different known ways can be found in technical literature and therefore they are not described herein for sake of brevity.

Service brake may also be actuated remotely as described herein under thanks to subsystem 20. In a first operative condition, i.e. no service braking is imparted to rear brakes 3 as disclosed in FIG. 1, no electrical input 22 is sent to valve 19 which is positioned so that does not allow the passage of fluid from accumulator 15 to rear brakes via conduit 17.

Figure 2:
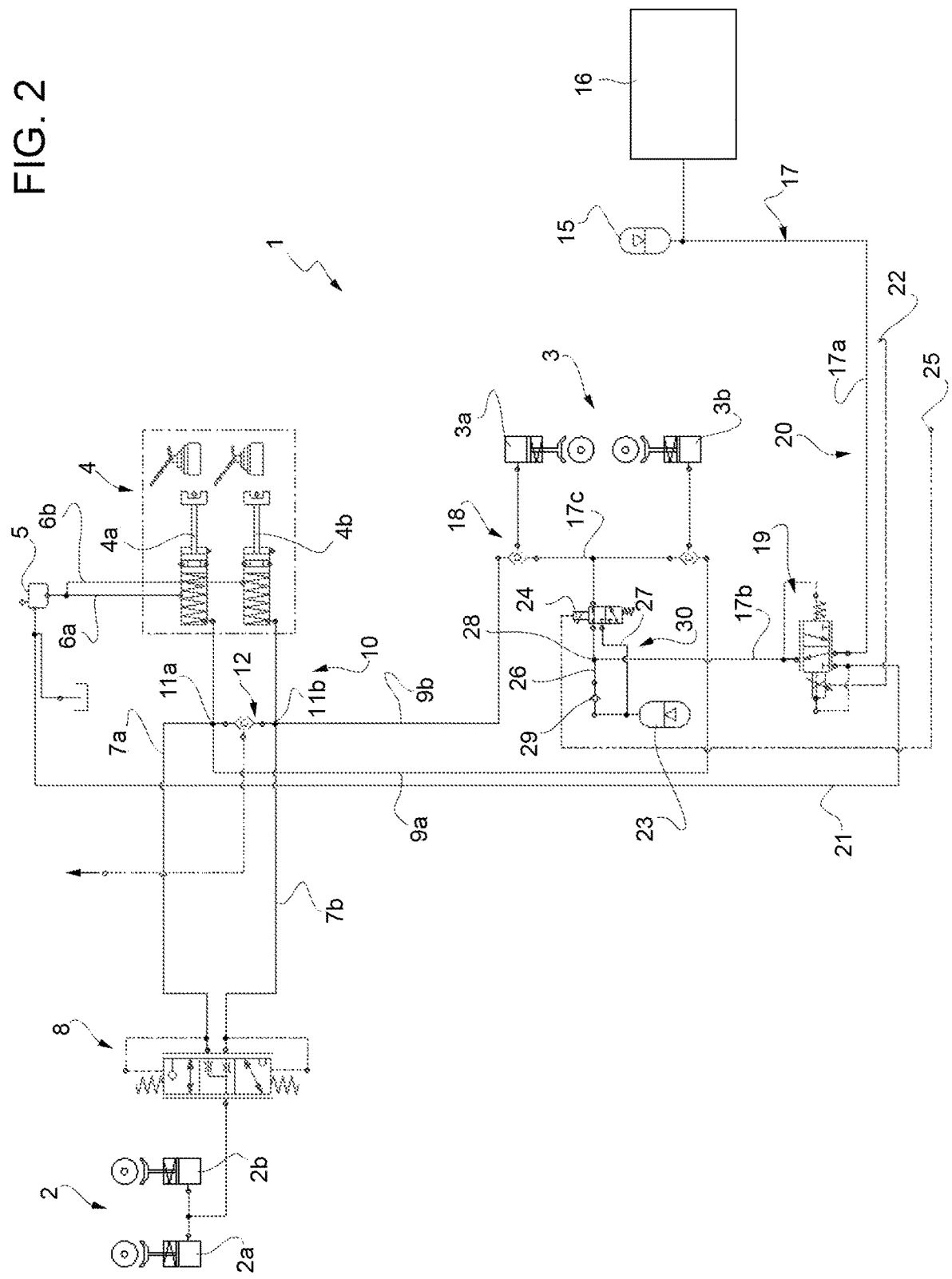
FIG. 2 is a hydraulic scheme of the hydraulic braking arrangement of FIG. 1 in a second operative condition.

When needed, a correspondent electrical input 22 is imparted to valve 19 which switches position (FIG. 2) and allows the discharge of accumulator 15 on rear brakes 3 via conduit 17. In the meanwhile, accumulator 15 is monitored, and if necessary charged by module 16. The presence of shuttle valve 18 isolates on board hydraulic subsystem 10 with respect to remote controlled hydraulic subsystem 20 so that they can be operated separately. In some peculiar conditions subsystems 10 and 20 may be operated together, in such case the higher pressure signal coming from such circuits will pass through valves 18 and actuate brakes 3a, 3b. During such phase, valve 24 is positioned so that accumulator 23 is fluidly connected to conduit 17. Therefore, when valve 19 allows the passage of fluid, accumulator 23 may be recharged via conduit 21 and check-valve 29.

Parking brake may also be actuated remotely as described herein under thanks to subsystem 30. In a first operative condition, i.e. no park brake is imparted to rear brakes 3, electrical input 25 is maintained on valve 24 which is therefore positioned so that does not allow the passage of fluid from accumulator 23 to rear brakes via conduit 27 and 17.

When needed, the correspondent electrical input 25 is removed to valve 24 which switches position and allows the discharge of accumulator 23 on rear brakes 3 via conduits 27 and portion 17c.

In the meanwhile valve 19 is positioned so that tank 5 is connected via conduit 21 to node 28 so as to allow drain of a residual pressure.

On board parking brake and remote parking brake may be actuated together, however, since they act on different devices, i.e. on board acts on a mechanical transmission path while remote acts hydraulically, no problems could arise.

As evolution only the hydraulic remote control system could be present, adding an on board electric actuation on valve 24.

Figure 3:
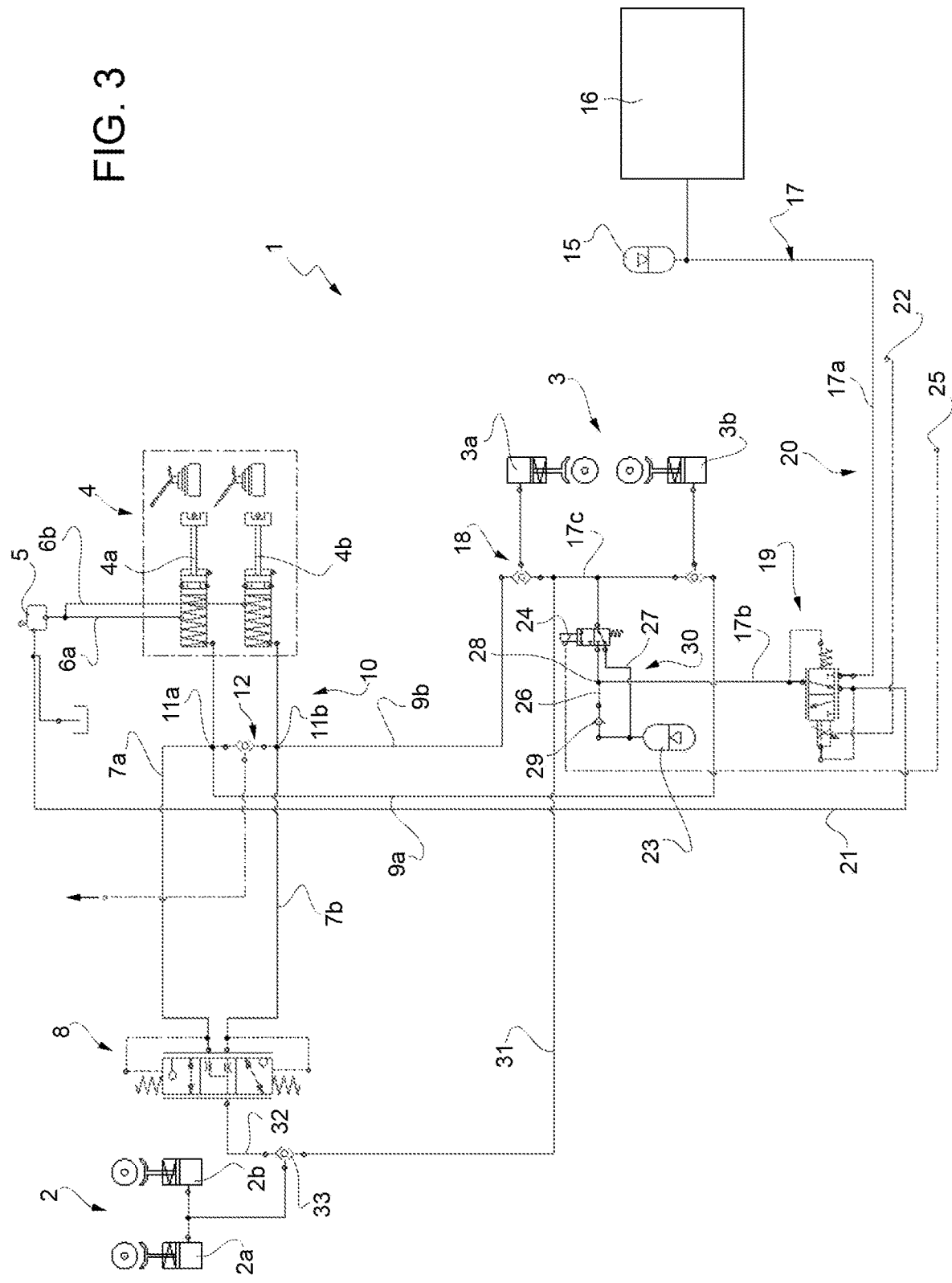
FIG. 3 is a hydraulic scheme of the hydraulic braking arrangement according a second embodiment of the invention

In a second embodiment of the invention, disclosed in FIG. 3, the hydraulic braking arrangement 1 is different from the embodiment of FIG. 1 because it comprises an additional conduit 31 fluidically connecting an output conduit 32 of valve 8 to first accumulator conduit 17.

In particular, conduit 31 is fluidly connected to output conduit 32 via a valve 33, preferably a shuttle valve 33, configured to allow the passage of fluid to front brakes 2 to the greater between fluid coming from conduit 31 and output conduit 32. Conduit 31 is fluidly connected to first accumulator conduit 17 downstream with respect to valves 19 and to valve 24.

The operation of the hydraulic braking arrangement 1 according to the second embodiment of the present invention is the following.

The operation of the subsystems 20 and 30 is the same operation of the first embodiment, however part of the fluid passing from accumulators 15 or 23 may flow through conduit 31 to front brakes 2. This second embodiment allows autonomous operation also on front brakes, wherever it is a different front brakes control management, respect to embodiment 1.

In view of the foregoing, the advantages of a hydraulic braking arrangement 1 according to the invention are apparent.

Thanks to hydraulic braking arrangement 1 it is possible to provide a hydraulic braking arrangement configured to allow the braking on-board in a traditional way and remotely making the vehicle autonomous.

The hydraulic braking arrangement 1 may be implemented on existing vehicle comprising only hydro mechanical subsystem 10; indeed, it is possible to add subsystems 20 and 30 to the hydraulic braking arrangement 1 of a traditional vehicle to adding to these latter the possibility of a remote/autonomous driving.

The simultaneous presence of hydro-mechanical and electro-hydraulic circuits make hydraulic braking arrangement 1 safer because of the intrinsic redundancy of the arrangement; in fact, if hydro-mechanical subsystem 20 fails, subsystems 10 and 30 would allow the user to use service and parking brake. Moreover, such simultaneous presence increase the flexibility of the vehicle which may be used in on-board or remote way by the driver in function of its intentions.

Subsystems 10, 20 and 30 are moreover conceived so that they could use the same oil, i.e. driveline oil, thereby simplifying the layout of the circuit and making possible the integration of subsystems 20 and 30 on any typology of existing subsystem 10.

Further, the layout of subsystems 20 and 30 is realized in an economic way by using standard and common components which may be easily supplied in the market.

It is clear that modifications can be made to the described hydraulic braking system 1 which do not extend beyond the scope of protection defined by the claims.

For example, subsystems 10, 20 and 30 may comprise different hydraulic topologies and the described valves 8, 12, 18, 19, 24 may be realized in any known way, maintaining the same function. In a similar way, recharging module 16 may be of any typology.

Further, master cylinders 4 may be substituted by equivalent devices, such as a brake valve connected to a hydraulic pressure source.

The invention claimed is:

1. A hydraulic braking arrangement for controlling rear brakes of an off-road vehicle, the hydraulic braking arrangement comprising:
   a hydro-mechanical service brake system fluidly connecting the rear brakes to a first source of fluid in pressure in response to a mechanical input imparted by a driver of the off-road vehicle;
   a remote controlled service brake system fluidly connecting the rear brakes to a second source of fluid in pressure in response to a first remote input; and
   a remote controlled park brake system fluidly connecting the rear brakes to a third source of fluid in pressure in response to a second remote input;
   wherein the third source is an accumulator and the remote controlled park brake system comprises a valve fluidly interposed between the accumulator and the rear brakes, the valve being configured to allow or deny passage of fluid from the accumulator to the rear brakes in response to the second remote input, wherein the valve is a three-way, two-position valve.

2. The hydraulic braking arrangement according to claim 1, further comprising shuttle valves configured to fluidly connect together the hydro-mechanical service brake system and the remote controlled service brake system to the rear brakes, the shuttle valves being configured to connect the rear brakes to only one of the hydro-mechanical service brake system and the remote controlled service brake system.

3. The hydraulic braking arrangement according to claim 1, wherein the second source is a second accumulator and the remote controlled service brake system comprises a second valve fluidly interposed between the second accumulator and the rear brakes, the second valve being configured to allow or deny passage of fluid from the accumulator to the rear brakes in response to the first remote input.

4. The hydraulic braking arrangement according to claim 3, wherein the second valve is a proportional valve.

5. The hydraulic braking arrangement according to claim 3, wherein the first source is a tank and the second valve is further fluidly connected to the tank.

6. The hydraulic braking arrangement according to claim 3, wherein the remote controlled service brake system further comprises a recharging module configured to recharge the second accumulator when a level of the second accumulator is under a preset threshold.

7. The hydraulic braking arrangement according to claim 1, wherein the valve is an ON-OFF valve.

8. The hydraulic braking arrangement according to claim 1, wherein the remote controlled park brake system is fluidly connected to the hydro-mechanical service brake system so that when the hydro-mechanical service brake system fluidly connects the first source and a recharging module of fluid in pressure to the rear brakes, the third source of fluid is charged by a flow coming from the first source and the recharging module.

9. The hydraulic braking arrangement according to claim 1, wherein said arrangement is further configured for controlling front brakes of said vehicles and comprises a fluidic connection between said front brakes, said hydro-mechanical service brake system and said remote controlled service braking systems so that when said hydro-mechanical service brake system or said remote controlled service braking system allows the fluidic connection of said first and second sources to rear brakes, a portion of such fluid flows to said front brakes.

10. The hydraulic braking arrangement according to claim 1, wherein the first remote input is received from outside of the off-road vehicle and is configured to generate electrical inputs.

11. A hydraulic braking arrangement for controlling rear brakes of an off-road vehicle, the hydraulic braking arrangement comprising:
- a hydro-mechanical service brake system fluidly connecting the rear brakes to a first source of fluid in pressure in response to a mechanical input imparted by a driver of the off-road vehicle;
- a remote controlled service brake system fluidly connecting the rear brakes to a second source of fluid in pressure in response to a first remote input, wherein the second source is a first accumulator and the remote controlled service brake system comprises a first valve fluidly interposed between the first accumulator and the rear brakes, the first valve being configured to allow or deny passage of fluid from the first accumulator to the rear brakes in response to the first remote input, wherein the first valve is a three-way, two-position valve; and
- a remote controlled park brake system fluidly connecting the rear brakes to a third source of fluid in pressure in response to a second remote input, wherein the third source is a second accumulator and the remote controlled park brake system comprises a second valve fluidly interposed between the second accumulator and the rear brakes, the second valve being configured to allow or deny passage of fluid from the second accumulator to the rear brakes in response to the second remote input.

12. The hydraulic braking arrangement according to claim 11, wherein the remote controlled park brake system is fluidly connected to the hydro-mechanical service brake system so that when the hydro-mechanical service brake system fluidly connects the first source and a recharging module of fluid in pressure to the rear brakes, the third source of fluid is charged by a flow coming from the first source and the recharging module.

13. The hydraulic braking arrangement according to claim 11, further comprising shuttle valves configured to fluidly connect together the hydro-mechanical service brake system and the remote controlled service brake system to the rear brakes, the shuttle valves being configured to connect the rear brakes to only one of the hydro-mechanical service brake system and the remote controlled service brake system.

14. The hydraulic braking arrangement according to claim 11, wherein the second valve is a second three-way, two-position valve.

15. The hydraulic braking arrangement according to claim 11, wherein at least one of the first valve and the second valve is a proportional valve.

* * * * *